United States Patent
Steinhauser

(10) Patent No.: US 8,762,016 B2
(45) Date of Patent: Jun. 24, 2014

(54) METHOD AND CONTROL DEVICE FOR CONTROLLING A POSITIVELY LOCKING SHIFT ELEMENT OF A TRANSMISSION

(71) Applicant: ZF Friedrichshafen AG, Friedrichshafen (DE)

(72) Inventor: Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/023,638

(22) Filed: Sep. 11, 2013

(65) Prior Publication Data

US 2014/0074364 A1 Mar. 13, 2014

(30) Foreign Application Priority Data

Sep. 13, 2012 (DE) .......................... 10 2012 216 305

(51) Int. Cl.
*G06F 7/00* (2006.01)

(52) U.S. Cl.
USPC .......................................................... 701/58

(58) Field of Classification Search
None
See application file for complete search history.

(56) References Cited

U.S. PATENT DOCUMENTS

| | | | |
|---|---|---|---|
| 4,373,619 A * | 2/1983 | Schritt et al. ..................... | 477/61 |
| 2012/0029778 A1 * | 2/2012 | Arnold et al. .................. | 701/61 |

FOREIGN PATENT DOCUMENTS

| | | |
|---|---|---|
| DE | 10 2009 002 203 A1 | 10/2010 |
| DE | 10 2009 056 793 A1 | 6/2011 |
| DE | 10 2010 063 029 A1 | 6/2012 |
| WO | 2007/057161 A1 | 5/2007 |
| WO | 2012/079846 A1 | 6/2012 |

OTHER PUBLICATIONS

German Search Report in corresponding German application No. 10 2012 216 305.0 mailed May 17, 2013.

* cited by examiner

*Primary Examiner* — Thomas Tarcza
*Assistant Examiner* — Adam Alharbi
(74) *Attorney, Agent, or Firm* — Davis & Bujold, PLLC; Michael J. Bujold

(57) ABSTRACT

A method of actuating a form-locking shift element of a transmission. To shift from a current gear to a target gear, an actuation time is determined for the locking shift element to be engaged during a gear shift depending on a reaction time of the assemblies participating during actuation of the locking shift element, an engaging time of the locking shift element, and at least one filtered signal such that the locking shift element is engaged within a specified rotational speed window encompassing a specified differential rotational speed. It is verified whether the locking shift element can be engaged within the specified rotational speed window depending on at least one unfiltered signal, and, if the locking shift element can be engaged within the specified rotational speed window, the actuation is unaffected; conversely, if the locking shift element cannot be engaged within the specified rotational speed window, the actuation is affected.

7 Claims, 2 Drawing Sheets

METHOD AND CONTROL DEVICE FOR CONTROLLING A POSITIVELY LOCKING SHIFT ELEMENT OF A TRANSMISSION

This application claims priority from German application serial no. 10 2012 216 305.0 filed on Sep. 13, 2012.

FIELD OF THE INVENTION

The invention relates to a method for actuating a positively-locking shift element of a transmission. The invention likewise relates to a control device for implementing the method.

BACKGROUND OF THE INVENTION

Transmissions are known from practice that have friction-locking shift elements and/or form-locking shift elements as shift elements. The present invention relates to a method for actuating a form-locking shift element of a transmission, wherein the transmission either exclusively uses form-locking shift elements, or form-locking shift elements and friction-locking shift elements in combination.

In order to properly engage a previously disengaged form-locking shift element when executing a gearshift from a current gear to a target gear, the form-locking shift element must be engaged or meshed within a specified rotational speed range or rotational speed window around a specified differential rotational speed. Otherwise, there exists the danger that the form-locking shift element cannot be engaged, or becomes damaged upon engaging.

To ensure the engagement of a form-locking shift element within the specified rotational speed window, the procedure known in practice for transmissions with at least one form-locking shift element is to determine an actuation time for a form-locking shift element to be engaged while shifting gears depending on the reaction time of the assemblies participating in the control of the form-locking shift element, depending on an engaging time of the form-locking shift element, and depending on at least one filtered signal, so that the form-locking shift element engages within the specified rotational speed window. The engaging time required to engage the form-locking shift element is, for example, dependent on a transmission fluid temperature, and when the transmission fluid temperatures are low, the engaging time is relatively long, and when the transmission fluid temperatures are high, the engaging time is relatively short.

The problem with such an actuation of a form-locking shift element of a transmission to be engaged is that changes can occur in the drivetrain directly before an actuation time determined in this manner, as well as directly after this actuation time, that make it impossible to engage the form-locking shift elements within the specified rotational speed window. A sudden increase or decrease in load from a driver actuating the gas pedal can, for example, suddenly change the rotational speed at the transmission input side. A sudden actuation of the brake pedal can also suddenly change the rotational speed at the transmission output side. Furthermore, a rotational speed at a transmission output side can, for example, suddenly change when an anti-lock braking system or anti-skid control fails.

Since filtered signals are used when determining the actuation time for a form-locking shift element to be engaged when shifting gears, such sudden signal changes are not sufficiently taken into account, when determining the actuation time, to subsequently ensure a smooth engagement of the form-locking shift element. If these signal changes only occur after the actuation time for the form-locking shift element, there is also no opportunity, according to the prior art, to influence the actuation of the form-locking shift element.

A method is known from DE 10 2009 056 793 A1 for executing a shift in an automatic transmission of a motor vehicle in which a differential rotational speed can be forced into the range of the specified rotational speed window for a form-locking shift element such that the rotational speed difference of the form-locking shift element is reduced by engaging at least one friction-locking shift element of the transmission.

SUMMARY OF THE INVENTION

Proceeding therefrom, the problem addressed by the present invention is to create a method for actuating a form-locking shift element of a transmission, as well as a novel control device.

This problem is solved by a method for actuating a form-locking shift element of a transmission as described herein.

According to the invention, whether the form-locking shift element can actually be engaged within the specified rotational speed window is verified depending on at least one unfiltered signal, and if it is then determined that the form-locking shift element can be engaged within the specified rotational speed window, the actuation of the form-locking shift element is not affected; conversely, if it then is determined that the form-locking shift element cannot be engaged within the specified rotational speed window, the actuation of the form-locking shift element is affected.

The present invention makes it possible to detect a sudden change in the differential rotational speed of the form-locking shift element to be engaged even when there is a sudden change in this differential rotational speed directly before a conventionally determined actuation time, or directly after such an actuation time, for example due to a sudden change in an input side rotational speed, and/or a sudden change in an output-side rotational speed. Then, if it is determined that the form-locking shift element can no longer engage within the specified rotational speed window due to this sudden change in differential rotational speed, the actuation of the form-locking shift element is influenced, i.e., by triggering a corresponding countermeasure. If conversely the form-locking shift element can be engaged within a specified rotational speed window, the actuation of the form-locking shift element is not affected. This can safely and reliably prevent component damage to the form-locking shift element.

The actuation time is preferably determined depending on a transmission input side and/or transmission output side rotational speed signal filtered by forming a gradient. Whether the form-locking shift element can actually engage within the specified rotational speed window is preferably verified depending on an unfiltered transmission input side and/or transmission output side rotational speed signal. This determination of the actuation time, as well as the verification of whether the form-locking shift element can be engaged within the specified rotational speed window, is reliable and simple.

According to one development, if it is then determined that the form-locking shift element cannot be engaged within the specified rotational speed window before the actuation time, the actuation is blocked and the current gear is retained. This development of the invention then allows component damage to the form-locking shift element to be avoided when a sudden change occurs in the differential rotational speed of the form-locking shift element directly before the actuation time.

According to one development, if it is then determined after the actuation time that the form-locking shift element cannot be engaged within the specified rotational speed window, the actuation is blocked and the transmission is put into neutral. This advantageous development of the invention then permits avoidance of component damage to the form-locking shift element if the sudden change in differential rotational speed is determined after the actuation time of the form-locking shift element.

According to another development, if it is then determined after the actuation time that the form-locking shift element cannot be engaged within the specified rotational speed window, and the reaction time of the assemblies participating in the actuation of the form-locking shift element has not been exceeded, the actuation is blocked and the current gear is retained; contrastingly, if it is determined after the actuation time that the form-locking shift element cannot be engaged within the specified rotational speed window and the reaction time of the assemblies participating in the actuation of the form-locking element has been exceeded, the actuation is terminated, and the transmission is put into neutral. This advantageous development of the invention also allows component damage to the form-locking shift element to be avoided if the sudden change in differential rotational speed is determined after the actuation time of the form-locking shift element.

Then, if the actuation of the form-locking shift element is blocked and the current gear is retained, the actuation of the form-locking shift element is released to execute a gearshift from the current gear to the target gear after a specified blocking time.

Then, if the actuation of the form-locking shift element is terminated and the transmission is put into neutral, the actuation of the form-locking shift element is enabled, after expiration of a specified locking time, to engage in a target gear starting from neutral.

Preferably, in order to verify whether the form-locking shift element can actually be engaged within a specified rotational speed window, a specified number of signal values of the respective unfiltered signal is preferably saved within a ring buffer such that, upon acceptance of a new signal value in the ring buffer, the oldest signal value is deleted from the ring buffer, wherein a difference is formed between the new signal value to be accepted and the oldest signal value to be deleted, wherein, if this difference is greater than a threshold value, it is concluded that the form-locking shift element cannot be engaged within the specified rotational speed window, whereas if this difference is less than the threshold value, it is concluded that the form-locking shift element can be engaged within the specified rotational speed window. The above check, with the assistance of signal values saved in a ring buffer, is easily and reliably feasible.

The control device according to the invention as described herein.

BRIEF DESCRIPTION OF THE DRAWINGS

Preferred developments will become apparent from the description that follows. Embodiments of the invention are explained in greater detail with reference to the drawings, without being limited thereto. These show.

DETAILED DESCRIPTION OF THE DRAWINGS

Figure 1:
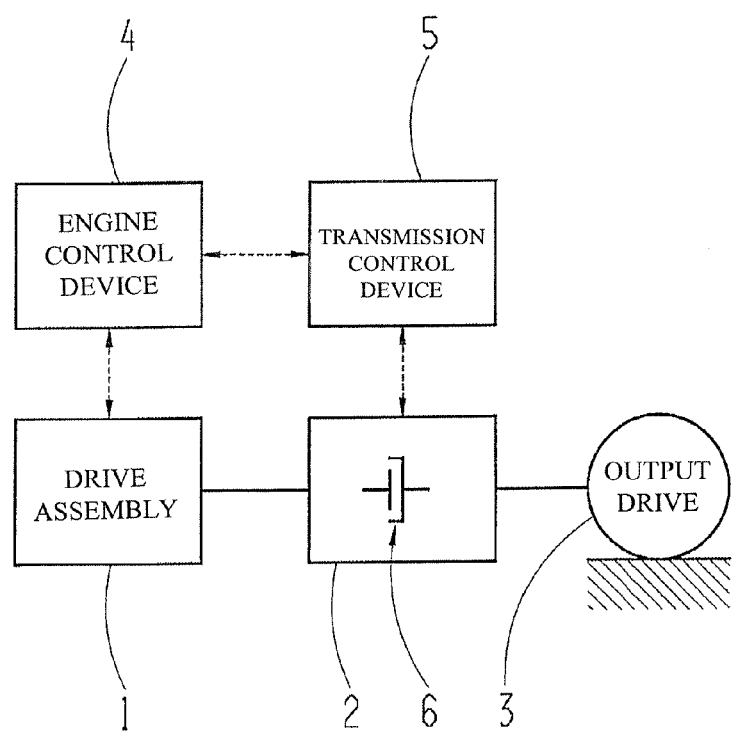
FIG. 1 a schematic representation of the drivetrain.

FIG. 1 shows a highly schematized drivetrain diagram for a motor vehicle having a drive assembly 1, a transmission 2, and an output drive 3, wherein the transmission 2 is located between the drive assembly 1 and the output drive 3.

The operation of the drive assembly 1 is controlled and/or regulated by an engine control device 4, and the operation of the transmission 2 is controlled by a transmission control device 5, wherein the engine control device 4 exchanges data with the drive assembly 1, wherein the transmission control device 5 exchanges data with the transmission 2, and wherein the two control devices 4 and 5 also exchange data with each other.

The transmission 2 has at least one form-locking shift element 6, wherein the invention relates to such details as can be used to safely and reliably engage or mesh the form-locking shift element 6 to be engaged without a damage hazard while executing a gear shift in the transmission 2 from a current gear to a target gear.

In order to properly actuate a form-locking shift element to be engaged while changing gears from a current gear to a target gear of the automatic transmission 2, an actuation time for the form-locking shift element 6 to be engaged is determined depending on a reaction time of the assemblies participating in the actuation of the form-locking shift element, depending on an engaging time of the form-locking shift element 6, and depending on at least one filtered signal.

This determination of the actuation time is performed such that the form-locking shift element 6 is engaged or meshed within a specified rotational speed window surrounding a specified differential rotational speed.

The actuation time is preferably determined depending on a transmission input side rotational speed signal filtered by forming a gradient, and depending on a transmission output side rotational speed signal filtered by a gradient formation. The gradient is formed via numerous signal values of the respective rotational speed signal in order to obtain a stable gradient signal.

According to the invention, it is also verified whether the form-locking shift element 6 can actually be engaged within the specified rotational speed window.

Then, if it is determined that the form-locking shift element 6 can be engaged within the specified rotational speed window, the actuation of the form-locking shift element 6 is not affected.

Then, in contrast, if it is determined that the form-locking shift element 6 cannot be engaged within the specified rotational speed window, the actuation of the form-locking shift element 6 is influenced by triggering a substitute measure in order to prevent component damage to the form-locking shift element.

It is preferably verified whether the form-locking shift element 6 can actually engage within the specified rotational speed window depending on an unfiltered transmission input side rotational speed signal and on an filtered transmission output side rotational speed signal.

Then, if the form-locking shift element 6 cannot be engaged within the specified rotational speed window, and this is determined before the actuation time, the actuation of the form-locking shift element 6 is blocked, and the current gear is retained. After passage of a specified blocking time, the actuation of the form-locking shift element 6 is then released to execute a gearshift from the current gear into a target gear.

Then, if it is determined after the actuation time that the form-locking shift element 6 cannot be engaged within the specified rotational speed window, the execution of the gear shifting and actuation of the form-locking shift element is terminated, and the automatic transmission 2 is put into neutral, and then, after the expiration of a specified blocking time, the actuation of the form-locking shift element 6 is released to engage in a target gear starting from neutral.

Additional details of the method according to the invention will be described below with reference to FIG. 2, wherein FIG. 2 relates to details that serve to verify whether the form-locking shift element 6 can actually be engaged within the specified rotational speed window.

Figure 2:
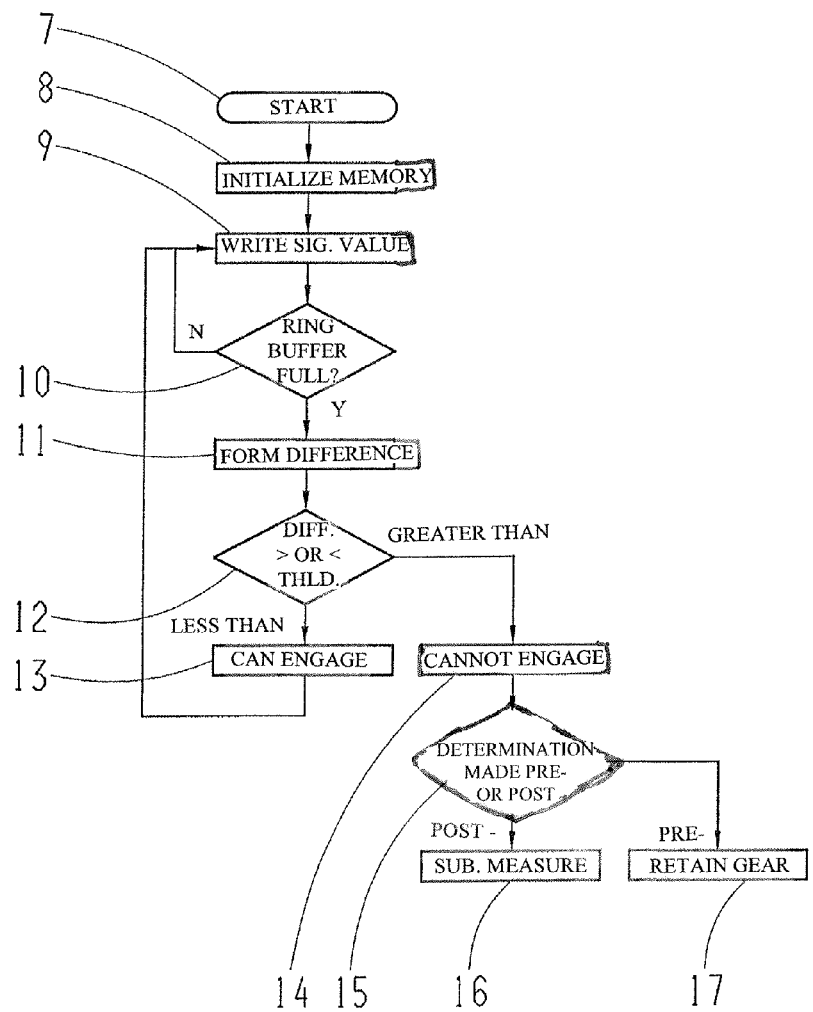
FIG. 2 a signal flow chart to illustrate the method according to the invention for actuating a form-locking shift element of a transmission.

A block 7 of the signal flow chart in FIG. 2 visualizes a start of this verification, wherein in a subsequent block 8, a memory is initialized in which the respective signal to be used for verification is saved.

The memory initialized in block 8 is preferably a ring buffer in which a specified number of signal values for the respective unfiltered signal can be saved such that, when a new signal value is accepted in the ring buffer, the oldest signal value is deleted therefrom.

In a subsequent block 9, signal values of the respective unfiltered signal are written into the respective ring buffer within a specified time slot, wherein block 10 checks whether the ring buffer is full. If this is not the case, a branching back to step 9 occurs. If, in contrast, block 10 determines that the ring buffer is full, branching to block 11 occurs, wherein the new signal value to be saved in the ring buffer, as well as the oldest signal value to be deleted from the ring buffer, are read out in block 11.

In block 11, a difference is formed between the new signal value to be accepted and the oldest signal value to be deleted, wherein a subsequent block 12 checks whether this difference is greater or lesser than a threshold value.

If this difference is less than a threshold value, there is branching proceeding from block 12 to block 13, wherein block 13 then concludes that the form-locking shift element 6 can be engaged within the specified rotational speed window, and the actuation of the form-locking shift element 6 is therefore not affected.

If, conversely, it is determined in block 12 that the difference between the new signal value to be accepted and the oldest signal value to be deleted is greater than a threshold value, there is a branching proceeding from block 12 to block 14, wherein it is concluded in block 14 that the form-locking shift element 6 cannot be engaged within the specified rotational speed window.

Subsequently, it is checked in block 15 whether this detection that the form-locking shift element 6 cannot be engaged within the specified rotational speed window was determined before or after the actuation time.

If it is determined in block 15 that the actuation of the form-locking shift element has already occurred, block 16, in a first variation, initiates a substitute measure of putting the automatic transmission 2 into neutral.

If it is determined in block 15 that the actuation of the form-locking shift element has already occurred, and also determines that the reaction time of the assemblies participating in the actuation of the form-locking shift element 6 has not been exceeded, a substitute measure is alternately initiated in block 16 in a second variation so that the automatic transmission 2 is not put into neutral, but is rather kept in the current gear. If, contrastingly, the reaction time of the assemblies participating in the actuation of the form-locking shift element 6 is exceeded, the automatic transmission 2 is put into neutral in this second variation.

If block 15 determines that the actuation of the form-locking shift element 6 has not yet occurred, a substitute measure is introduced in block 17 to retain the current gear.

The method according to the invention is executed on the control side by a control device, preferably a transmission control device 5. The control device according to the invention comprises means for executing the method, i.e., data interfaces for directly exchanging data with the participating assemblies, or for indirectly exchanging data with the participating assemblies, by means of an additional control device, a processor for processing filtered and unfiltered data and for generating control signals, and at least one memory, especially a ring buffer, for storing data.

REFERENCE SYMBOLS

1 Engine
2 Transmission
3 Output drive
4 Engine control device
5 Transmission control device
6 Form-locking shift element
7 Block
8 Block
9 Block
10 Block
11 Block
12 Block
13 Block
14 Block
15 Block
16 Block
17 Block

The invention claimed is:

1. A method of actuating a form-locking shift element (6) of a transmission (2) to execute a gear shift from a currently engaged gear to a target gear of the transmission (2), the method comprising the steps of:
    determining an actuation time for the form-locking shift element (6) of the transmission (2) to be engaged during the gear shift, depending on a reaction time of assemblies participating in actuation of the form-locking shift element (6), depending on an engaging time of the form-locking shift element (6), and depending on at least one filtered signal, so that the form-locking shift element (6) is engaged within a specified rotational speed window encompassing a specified differential rotational speed;
    verifying whether the form-locking shift element (6) can actually be engaged within the specified rotational speed window depending on at least one unfiltered signal; and
    if it is determined that the form-locking shift element (6) can be engaged within the specified rotational speed window, not affecting the actuation of the form-locking shift element, but, if it is determined that the form-locking shift element (6) cannot be engaged within the specified rotational speed window, affecting the actuation of the form-locking shift element;
    if it is determined that the form-locking shift element (6) cannot be engaged within the specified rotational speed window and the reaction time of the assemblies participating in the actuation of the form-locking shift element (6) is not exceeded, blocking the actuation of the form-locking shift element and retaining the current gear; and
    if it is determined that the form-locking shift element (6) cannot be engaged within the specified rotational speed window and the reaction time of the assemblies participating in the actuation of the form-locking element (6) is exceeded, terminating the actuation of the form-locking shift element and shifting the transmission (2) into neutral.

2. The method according to claim 1, further comprising the step of determining the actuation time depending on at least one of a transmission input side rotational speed signal filtered by a gradient formation, and a transmission output side rotational speed signal filtered by a gradient formation.

3. The method according to claim 1, further comprising the step of verifying whether the form-locking shift element (6) can actually engage within the specified rotational speed window, depending on at least one of an unfiltered transmission input side rotational speed signal and an unfiltered transmission output side rotational speed signal.

4. The method according to claim 1, further comprising the steps of enabling the actuation of the form-locking shift element (6) in order to execute a gearshift from the current gear to the target gear after a specified blocking time, if the actuation of the form-locking shift element (6) was blocked and the current gear was retained.

5. The method according to claim 1, further comprising the steps of enabling the actuation of the form-locking shift element (6), after expiration of a specified locking time, in order to engage the target gear starting from neutral, if the actuation of the form-locking shift element (6) was terminated and the transmission (2) was shifted into neutral.

6. The method according to claim 1, further comprising the steps of verifying whether the form-locking shift element (6) can actually be engaged, within a specified rotational speed window, by saving a specified number of signal values of the respective unfiltered signal in a ring buffer such that, upon acceptance of a new signal value in the ring buffer, an oldest signal value is deleted from the ring buffer, to form a difference between the new signal value to be accepted and the oldest signal value to be deleted;
concluding that the form-locking shift element (6) cannot be engaged within the specified rotational speed window, if the difference between the new signal value and the oldest signal value is greater than a threshold; and
concluding that the form-locking shift element (6) can be engaged within the specified rotational speed window, if the difference between the new signal value and the oldest signal value is less than the threshold.

7. A transmission control device (5) for actuating a form-locking shift element (6) of a transmission (2) to execute a gear shift from a currently engaged gear to a target gear of the transmission (2);

the transmission control device determining an actuation time for the form-locking shift element (6) of the transmission (2) to be engaged during the gear shift, depending on a reaction time of assemblies participating in actuation of the form-locking shift element (6), depending on an engaging time of the form-locking shift element (6), and depending on at least one filtered signal, so that the form-locking shift element (6) is engaged within a specified rotational speed window encompassing a specified differential rotational speed;
the transmission control device verifying whether the form-locking shift element (6) can actually be engaged within the specified rotational speed window depending on at least one unfiltered signal; and
if it is determined that the form-locking shift element (6) can be engaged within the specified rotational speed window, the transmission control device unaffecting the actuation of the form-locking shift element, but, if it is determined that the form-locking shift element (6) cannot be engaged within the specified rotational speed window, the transmission control device affecting the actuation of the form-locking shift element;
if the transmission control device (5) determines, for the actuation time, that the form-locking shift element (6) cannot be engaged within the specified rotational speed window and the reaction time of the assemblies participating in the actuation of the form-locking shift element (6) is not exceeded, the actuation of the form-locking shift element is blocked and the current gear is retained; and
if the transmission control device (5) determines, for the actuation time, that the form-locking shift element (6) cannot be engaged within the specified rotational speed window and the reaction time of the assemblies participating in the actuation of the form-locking element (6) is exceeded, the actuation of the form-locking shift element is terminated and the transmission (2) is shifted into neutral.

\* \* \* \* \*